US005885906A

United States Patent [19]

Reynolds et al.

[11] Patent Number: 5,885,906

[45] Date of Patent: Mar. 23, 1999

[54] LOW PIM REFLECTOR MATERIAL

[75] Inventors: Robert L. Reynolds, Los Angeles; John R. Bartholomew, Torrance; Kenneth J. Schmidt, Anaheim, all of Calif.

[73] Assignee: Hughes Electronics, Los Angeles, Calif.

[21] Appl. No.: 697,109

[22] Filed: Aug. 19, 1996

[51] Int. Cl.[6] .............................. H01Q 1/28; B32B 15/02; B32B 15/08; B32B 15/14; B32B 33/00

[52] U.S. Cl. .............................. 442/6; 343/832; 427/593; 427/123; 427/124; 427/125; 427/296; 442/46; 428/332; 428/334; 428/335; 428/336; 428/458

[58] Field of Search .............................. 343/832; 427/593, 427/123, 124, 125, 296; 442/6, 46; 428/332, 334, 335, 336, 458

[56] References Cited

PUBLICATIONS

Hoeber, Christopher F., et al.; "Passive Intermodulation Product Generation In High Power Communications Satellites"; Ford Aerospace & Communications Corporation; pp. 1–14; 1985.

Lui, P.L.; "Passive Intermodulation Interference In Communication Systems"; Electronics & Communication Engineering Journal; pp. 109–118; Jun. 1990. plus p. 154.

Levy, Donald J, et al.; "Metallic Meshes For Deployable Spacecraft Antennas, Part I"; SAMPE Journal; pp. 4–7; May/Jun. 1973.

*Primary Examiner*—James C. Cannon

*Attorney, Agent, or Firm*—Elizabeth E. Leitereg; Terje Gudmestad; W. K. Denson-Low

[57] ABSTRACT

A mesh material for a spacecraft antenna reflector is disclosed. The mesh material has a base material made from a dielectric fabric. A conductive material, such as nickel, is applied to the dielectric mesh. The type and thickness of the conductive material is adjusted to regulate the final conductivity of the reflective surface to a predefined range. The present invention utilizes a range that reduces PIM while at the same time maintains a high degree of RF reflectivity. The preferred range is 0.01 to 10 ohms per square.

19 Claims, 4 Drawing Sheets

LOW PIM REFLECTOR MATERIAL

TECHNICAL FIELD

The present application generally relates to materials, particularly mesh materials, for spacecraft or satellite antenna reflectors, and more particularly to a reflector material with low passive intermodulation.

BACKGROUND ART

High powered multichannel communication satellites for land and sea mobile communications experience a source of interference called passive intermodulation (PIM). The basic PIM phenomenon is caused by currents flowing in components with non-linear voltage-current behavior. These components then radiate and the resultant signals are picked up as noise in the system. These non-linear components can generate harmonic noise in a single carrier system, intermodulation in a multiple carrier system, and even intermodulation in a single carrier system where there is a pick-up in the system from other nearby radiations.

In most early communication systems, the multitude of noise frequencies was not a significant concern. The amplitude of the noise was several orders of magnitude lower than the signal. Space communication systems, however, require the coexistence of high power transmissions and low power receptions, often in the same radio frequency (RF) hardware. With the trend toward higher power, wider bandwidths and greater receiver sensitivity, the susceptibility of new mobile communication satellites to PIM problems is increasing.

The phenomenon of passive intermodulation is discussed, for example, in "Passive Intermodulation Product Generation In High Power Communications Satellites," Ford Aerospace & Communications Corp., 1985, and in Passive Intermodulation Interference in Communication Systems, ELECTRONICS & COMM. ENG. JOURNAL, June, 1990.

Many potential causes of PIM have been identified, but finding cures for the problem has not always been successful. Also, each spacecraft design is unique and has its own set of problems. Some general solutions to the problem involve quality workmanship, thorough testing procedures,. and proper choice of components and materials.

In order to provide protection from some PIM signals (as well as other environmental factors), communication satellites and other spacecraft typically employ protective blankets with PIM shields over the main bodies of the spacecraft. These protective blankets generally utilize conductive foils and thin film materials, or carbon-filled and thin film materials. PIM protection is also needed on auxiliary and/or protruding components, such as antennas and arrays.

Most satellites utilize a pair of antennas and may include a reflector mesh for transmitting and/or receiving signals from ground stations. The mesh is stretched and mounted over open frames. The mesh is positioned on the inside concave surfaces of the parabolic reflectors. Typically, to minimize interference, a transmitting antenna is positioned on one side of the spacecraft body and a receiver antenna is positioned on the opposite side. Satellites with a single dualpurpose antenna are typically more efficient and save significant expense, hardware and weight. Single antennas on spacecrafts also have the capability to use a common feed, filtering system, reflector and boom, which also saves weight and expense. Single antenna spacecraft are not favored however, due to potential interference problems, typically caused by PIM.

Antennas on satellites and other spacecraft normally function in the range of 100 MHz to 100 GHz, although the missions may vary widely for commercial, scientific, or military purposes. The antenna reflectors typically range up to 30–50 feet or more in diameter. These large antennas are designed to be foldable for storage and transport into orbit and deployable to their full size once the spacecraft reaches its destination. Where mesh reflectors are utilized, a flexible mesh material is typically stretched over a rib or other type of structure which has a parabolic dish shape. In the past, the mesh for the antennas has been made from a variety of materials, including metallized materials, fiberglass, polyester materials, synthetic materials, fibrous metal materials, and the like, and combinations thereof. Metallic meshes are discussed, for example, in Levy et al., "Metallic Meshes for Deployable Spacecraft Antennas," SAMPLE JOURNAL (May/June 1973).

SUMMARY OF THE INVENTION

It is a basic object of the present invention to provide improved materials for spacecraft or satellite antennas. It is also an object of the present invention to provide a material, such as a mesh material, for an antenna reflector which has low passive intermodulation (PIM). It is a further object of the present invention to provide a metallized deployable reflector material which is an improvement over known metallized materials.

Another object of the present invention is to provide a PIM-protective material for a spacecraft antenna which allows use of a single receiver/transmitter antenna on the spacecraft or satellite. It is still another object of the present invention to provide an effective low passive intermodulation material to sufficiently cover external sources of passive intermodulation without inherently generating a substantial passive intermodulation potential.

Still another object of the present invention is to provide a protective material which limits inherent PIM (self-contact PIM) generation, and shields external PIM. In addition, another object of the present invention is to provide a passive intermodulation material which is light-weight, economical to produce, is easily conformable to a structure, and has improved thermal properties.

The basic objective of the present invention is to provide a deployable reflector material with acceptable reflectivity, weight, mechanical, thermal, and light transmission properties and which reduces its maximum inherent (or self-contact) passive intermodulation potential to a level that will not substantially affect system performance.

The present invention meets the above-stated objects and provides a passive intermodulation material which comprises a particular metallized deployable layer. The material is preferably a mesh material and positioned as a reflector on an antenna which protrudes outwardly from the body of the spacecraft. The base material of the mesh layer is a dielectric fabric, preferably Kevlar. A conductive material, such as nickel, is applied to the dielectric fabric in the dielectric mesh. The thickness of the conductive materials is adjusted to regulate final conductivity of the reflective surface to a predefined range, preferably between 0.01–10.0 ohms per square. This predefined range reduces PIM while, at the same time, maintains a high degree of RF reflectivity.

In one embodiment of the invention, a woven mesh of nickel-plated Aracon fibers is utilized. These fibers comprise Kevlar thread and each filament is individually plated with nickel. The thickness of the plating and the conductivity of the nickel are such that the surface resistivity of the mesh is designed to fall within a prespecified PIM reduction range. The PIM reduction is normalized to the saturated PIM potential of a highly conductive surface, such as aluminum or gold. By balancing the factors between PIM and reflectivity loss, a balance is made which substantially reduces PIM risk while maintaining sufficient RF reflectivity.

Other embodiments of the invention include members with layers of a metal material, such as aluminum, copper, silver and gold, which are vacuum deposited as a thin film on a dielectric substrate, such as a plastic material, kevlar, or the like. The thickness of the film and thus the surface resistivity is controlled by the deposition thickness.

With the present invention, a PIM-protective layer is provided which allows use of a single antenna for a spacecraft and thus which provides the accompanying weight, expense and space benefits and advantages.

These and other features, aspects and advantages of the present invention will become apparent when the following description is read in accordance with the accompanying drawings and appended claims.

BEST MODE(S) FOR CARRYING OUT THE INVENTION

Figure 1:
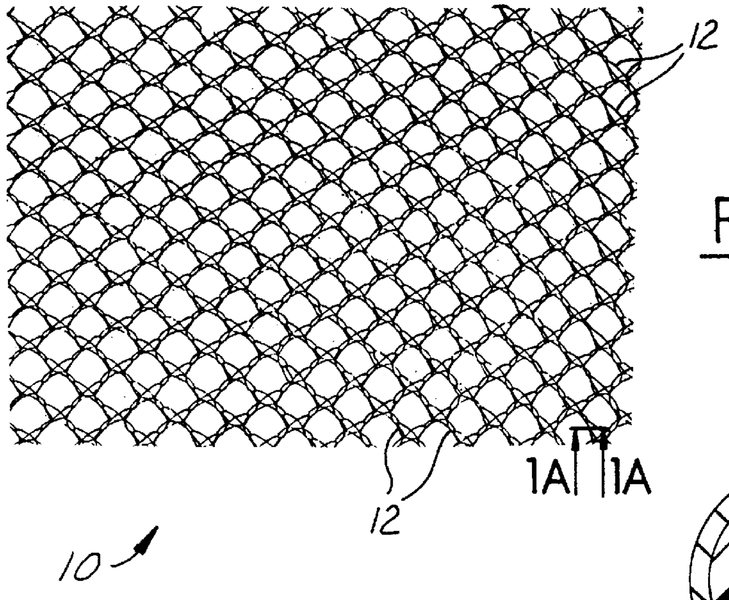
FIG. 1 depicts a woven mesh material utilizing the present invention.

Turning now to FIG. 1, there is shown a PIM-protective mesh material 10 in accordance with the present invention. The mesh material 10 includes a plurality of base material fibers 12 woven into a fabric mesh.

Figure 1A:
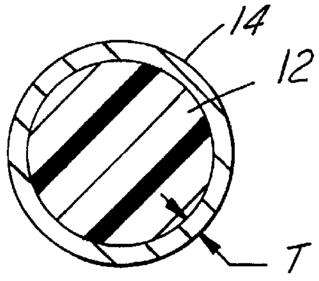
FIG. 1A is a cross-sectional view of a strand of mesh material as shown in FIG. 1, the view taken along line 1A—1A in FIG. 1 and in direction of the arrows.

The base material 12 for the mesh is preferably a dielectric fiber, such as Kevlar®. A conductive material 14, such as nickel or equivalent material, is applied to the dielectric fibers of the mesh 10. This is shown in FIG. 1A. The thickness of the conductive material is adjusted to regulate the final conductivity of the reflective surface to a prespecified range which reduces PIM while at the same time maintains a high degree of RF reflectivity. The present invention provides a deployable reflector mesh with acceptable reflectivity, weight, mechanical, thermal, and light transmission properties. At the same time, the invention reduces the "inherent" (or self-contact) PIM potential to a level that is incapable of substantially affecting the performance of the satellite system. In particular, the invention has the advantage that it reduces the surface conductivity to limit the conducted RF energy from self-generating excessive PIM, while maintaining an overall surface conductivity sufficiently high to retain a sufficient "free-space" RF reflectivity.

In accordance with the present invention, the metallized mesh 10 is capable of reflecting a minimum of 97% of the RF energy while at the same time reducing the "inherent" PIM (or self-PIM) by at least −40 dB. Preferably, the invention reduces the inherent PIM between −2 to −70 dB and more preferably −3 to −55 dB.

Figure 2:
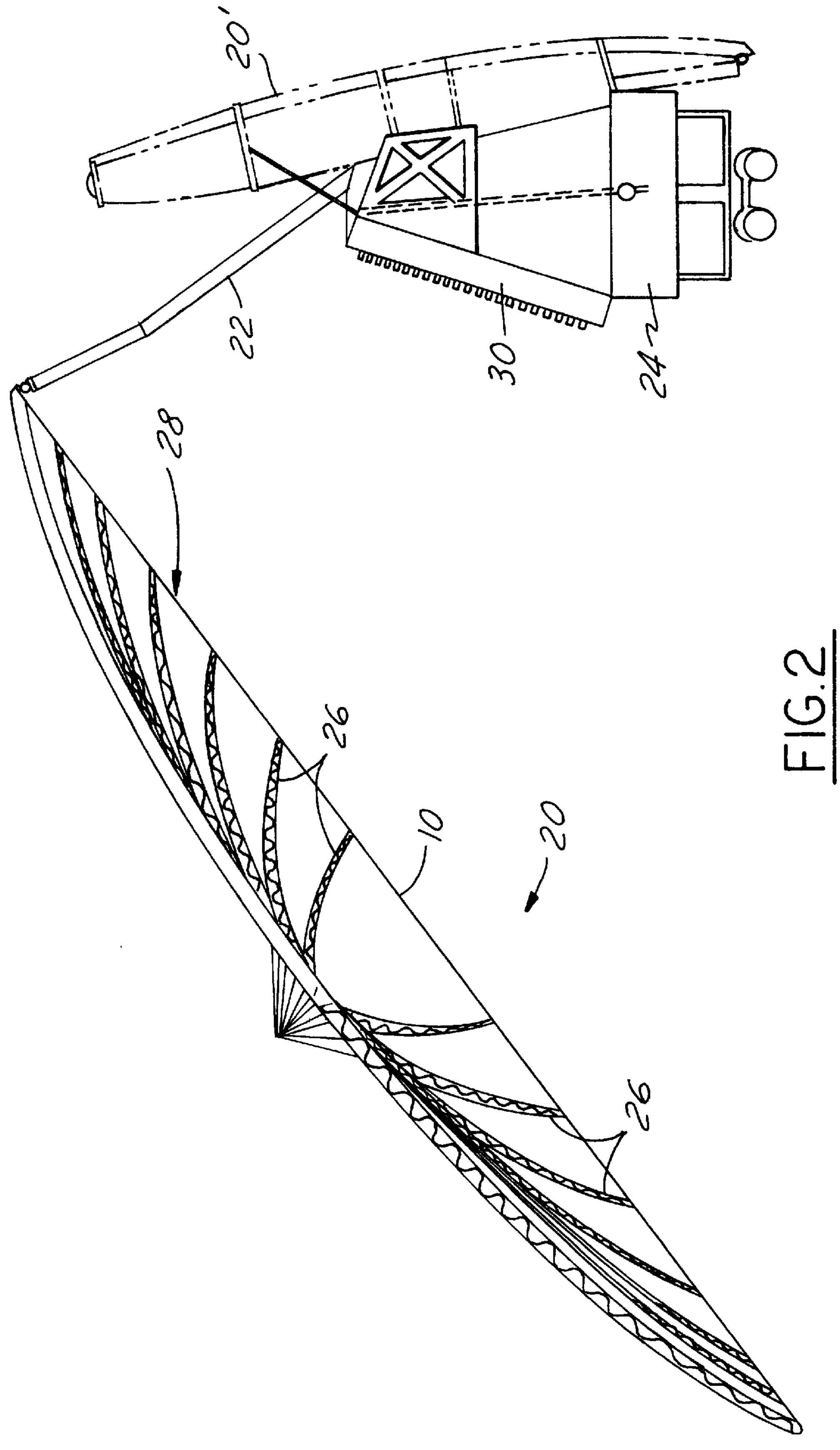
FIG. 2 depicts a spacecraft showing use of the present invention on a reflector.

The present invention can be applied to the diplexed L-band reflector in known spacecraft. The use of the present invention on an antenna reflector is shown in FIG. 2. The invention substantially reduces the risk of in-orbit PIM on PIM-sensitive programs. This allows for greater freedom of use and reduced test and re-work time during spacecraft development and build-outs.

As shown in FIG. 2, an antenna 20 is connected by an arm or boom 22 to a spacecraft or satellite body 24. When the antenna 20 is unfurled, the reflector 28 forms a parabolic structure. A plurality of radial ribs 26 are deployed in a elliptical configuration forming a parabolic-shaped reflector dish 28. The metallic mesh material 10 is attached to the ribs 26. When the antenna is deployed, the mesh is stretched in a concave shape inside the parabolic dish forming the reflector for the antenna. The radial ribs are thin and flexible to support the mesh fabric and maintain the parabolic contour. The ribs can be made of metal or a composite material.

A feed 30 for the antenna is positioned on the spacecraft body 24. The feed has an array of antenna feeds or cups.

When the spacecraft or satellite is transported into orbit, the antenna is folded into a smaller package. This is shown in phantom lines and designated by the numeral 20'. Once the spacecraft is positioned in space, the antenna 20 is unfurled into the shape and position shown in FIG. 2.

In the preferred embodiment of the invention, the metallized reflector mesh at L-band comprises a woven 0.125 inch tricot cellular mesh of nickel-plated Aracon fibers. Aracon is a fiber made by the DuPont Corporation and consists of a 55 Denier Kevlar® thread composed of 24×0.0006 inch filaments in a 0.004 fiber size. In the Aracon process, each of the Kevlar® filaments is individually and uniformly plated with nickel. In order to achieve the desired mesh surface resistivity, the thickness of the plating is specified in terms of linear resistivity (ohms per foot) of the 55 Denier fiber.

Figure 5:
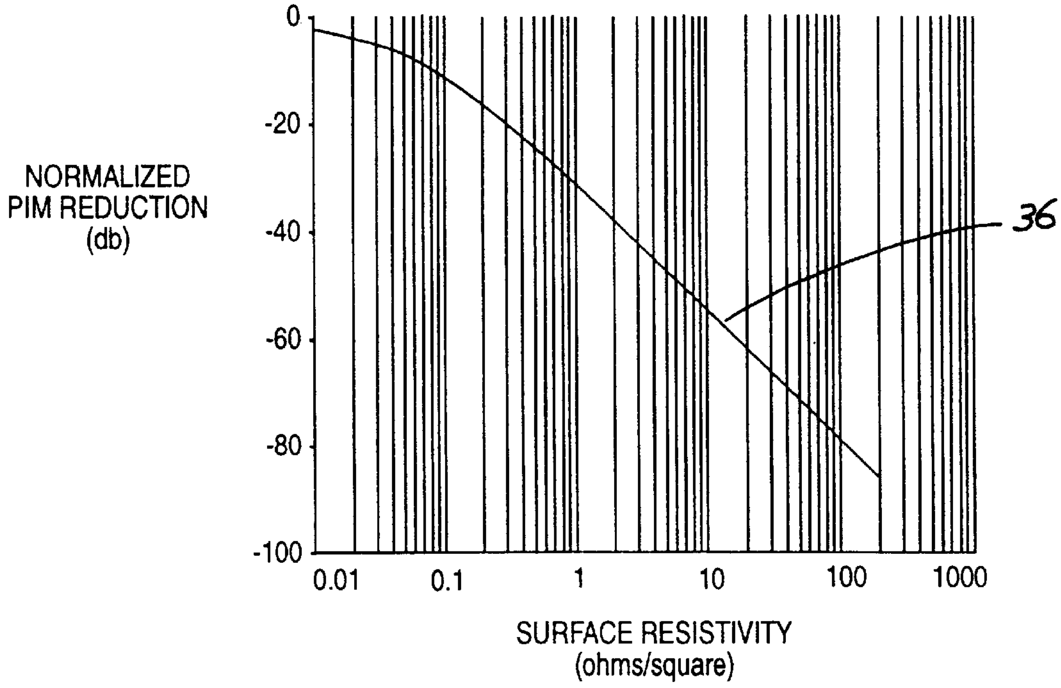
FIG. 5 is a graph showing the predicted inherent PIM reduction for a nickel Aracon mesh.

The conductivity of the nickel plating is such that the surface resistivity of the 55 Denier, tricot mesh can be designed to fall within the desired PIM reduction range. The predicted inherent PIM reduction of 0.125 Aracon mesh material is shown in FIG. 5. The PIM reduction shown in the curve 36 indicates the reduction of "saturated" PIM as a function of the surface resistivity of the preferred mesh configuration. In this regard, the PIM reduction is normalized to the saturated PIM potential of a perfect conducting surface such as aluminum or gold.

Figure 3:
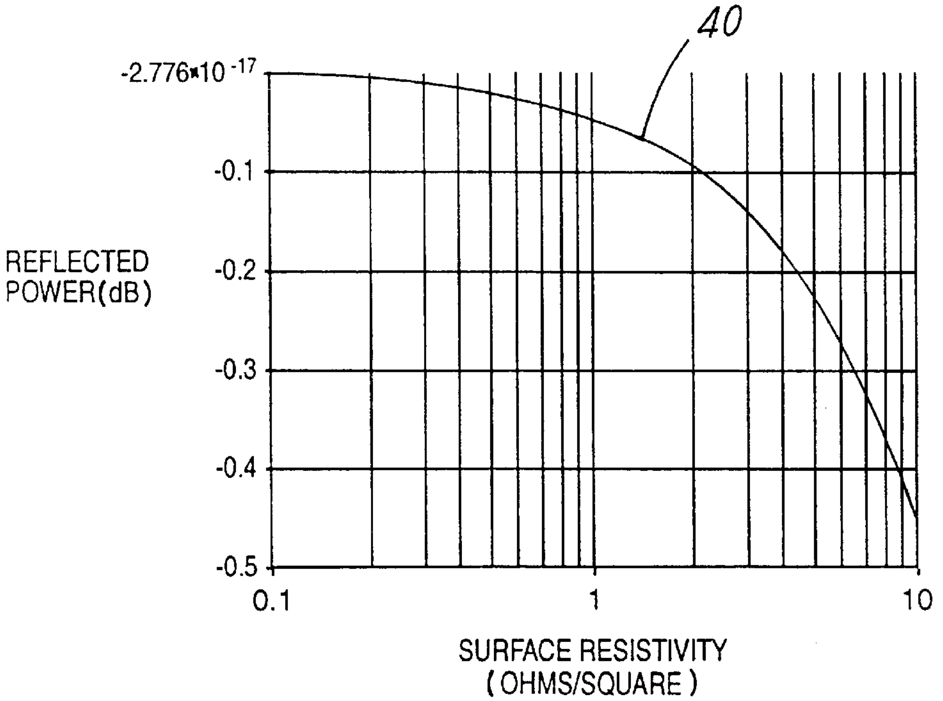
FIG. 3 is a graph indicating the free space reflectivity of a homogeneous surface as a function of surface resistivity.

FIG. 3 is a graph indicating the free space reflectivity of a resistive surface. The graph shows the reflective loss of a homogeneous resistive surface. The curve 40 shows the reflected loss in dBs as a function of the surface resistivity in ohms per square. Spacecraft radio frequency (RF) reflector losses are normally minus 0.1 dB or less. Surfaces with losses between −0.1 dB and −0.5 dB may be useful in special applications. Surfaces with losses greater than −0.5 dB probably would not be practiced in most applications.

Inherent (self-contact) PIM reduction is possible with resistivities greater than 0.1 ohm/square for highly conductive surfaces—such as aluminum or gold. Thus, the range of resistivities between 0.1 ohms/square and 10 ohms/square are practical for both reflectivity loss and PIM reduction. In accordance with the present invention, the range of resistivity is between 0.01 and 10 ohms per square and preferably between 1–2 ohms per square. By balancing the factors between PIM and reflectivity loss, a balance can be made to substantially reduce the PIM risk while maintaining a satisfactory RF reflectivity.

Figure 4:
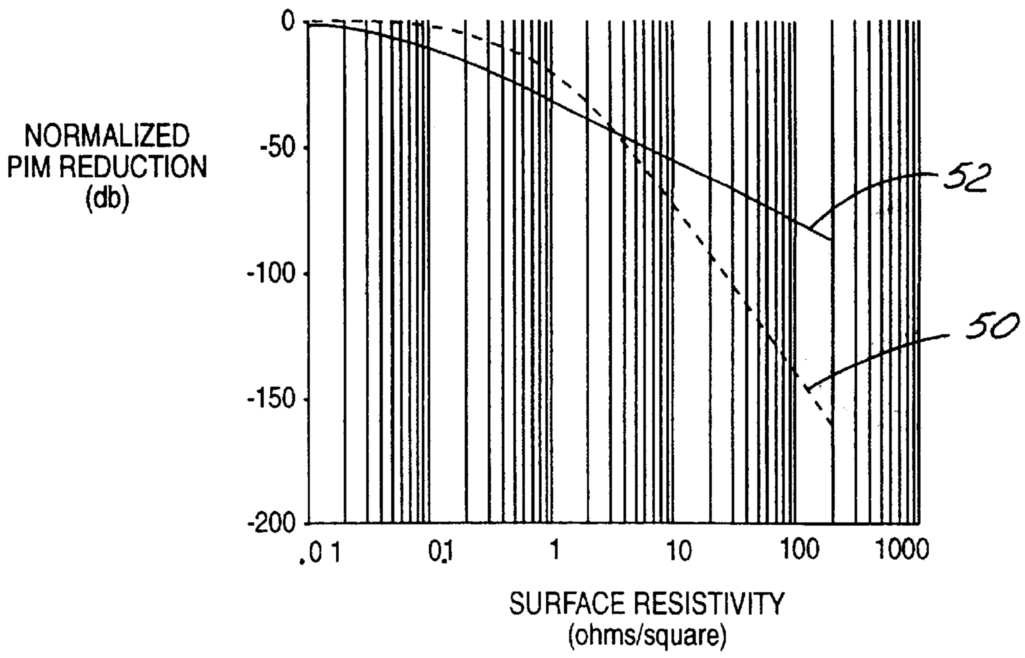
FIG. 4 is a graph showing the predicted inherent PIM reduction between different materials.

FIG. 4 is a graph or chart illustrating a comparison of inherent PIM reduction and surface resistivity for different materials. The comparison is made between a homogeneous surface of highly conductive metals such as aluminum, gold or silver and a mesh surface made of nickel or nickel-coated. The Y-axis is PIM amplitude normalized to the worst case level of an aluminum, gold or silver PIM source. The X-axis is the surface resistivity, in ohms/square, of a surface constructed of the specified materials.

Curve 50 demonstrates the predicted PIM response of an aluminum surface. Curve 52 demonstrates the predicted PIM response of a nickel mesh surface. The chart demonstrates a benefit of PIM reduction in both materials between the values of 0.1 ohms/square and 10 ohms/square surface resistivity. The nickel-coated mesh surface (52) produces less PIM than the aluminum surface (50) at lower resistivities and the aluminum surface produces less PIM at the higher resistivities.

FIG. 4 shows that although both materials are useful as low PIM, RF reflective surfaces in the range of resistivities between 0.1–10 ohm/square, the nickel mesh surface (52) is particularly useful in very low PIM, RF reflector applications. This is due to its inherently low PIM response in the "lower" resistivity ranges and results in a unique combination of low inherent PIM response and low reflectivity loss. The useful range of surface resistivities for a nickel mesh, as shown in FIG. 4, is 0.1–10 ohm/square in reflector applications.

As indicated above, FIG. 5 illustrates the predicted inherent PIM reduction for nickel Aracon mesh. As shown, the mesh material has excellent PIM response in the entire 0.1–10 ohm/square range of resistivities.

Figure 6:
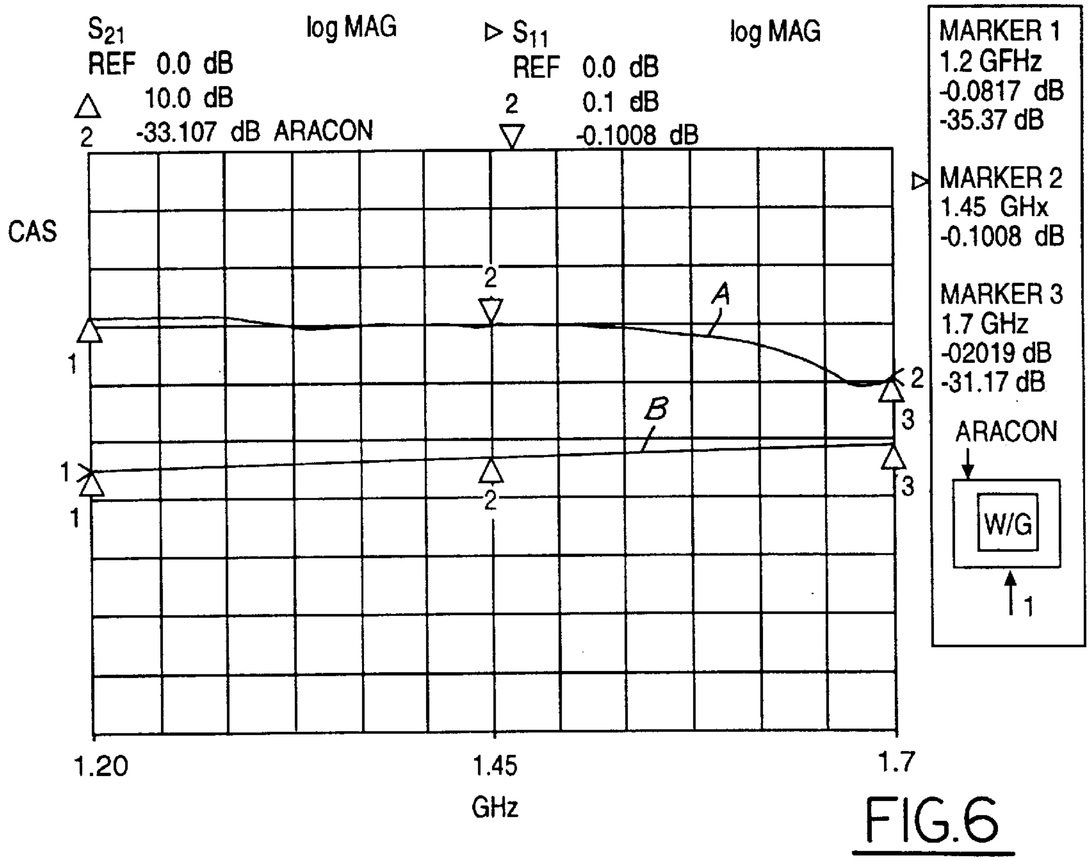
FIG. 6 is a graph showing the measured RF reflectivity and through loss for a nickel Aracan mesh.

An Aracon mesh, in accordance with the abovestated preferred embodiment, was electrically tested. The surface resistivity measured between 2.1 ohms per square and 2.5 ohms per square. The graph shown in FIG. 6 shows the measured RF reflectivity and through loss. As shown in FIG. 6, the dB loss is shown as a function of radio frequency in gigahertz (GHz).

Figure 7:
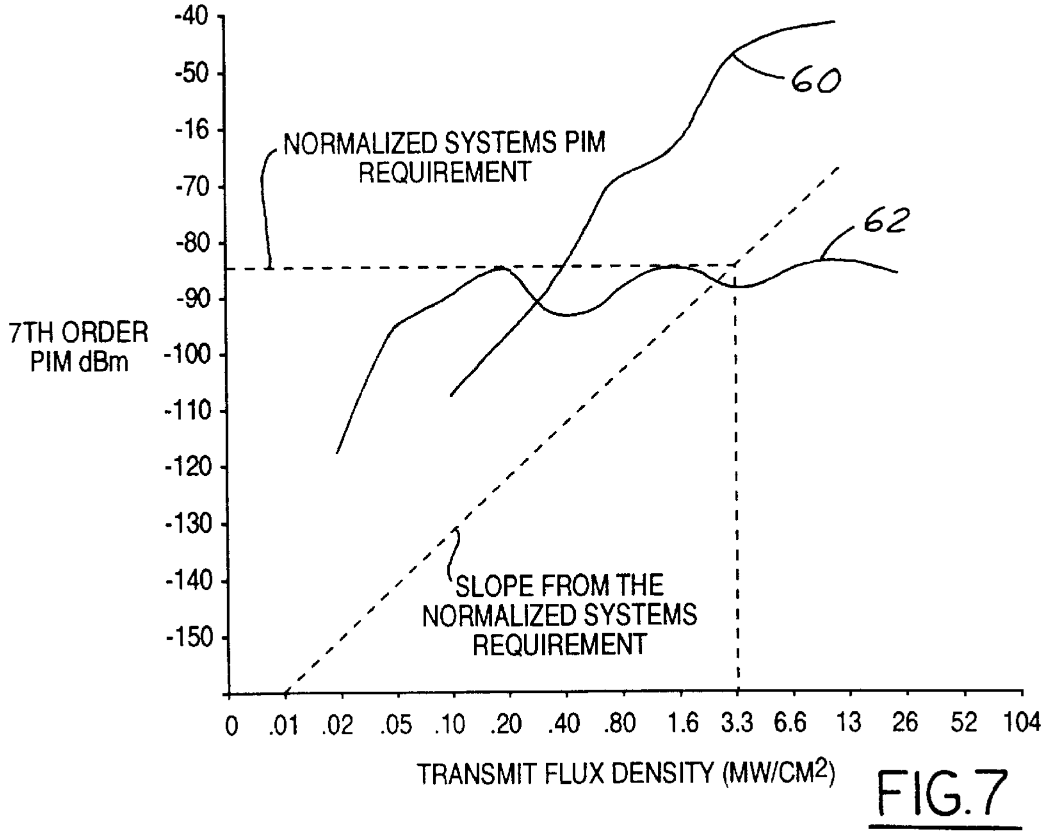
FIG. 7 is a graph showing an inherent PIM comparison between the present invention and a known gold-molybdenum mesh.

An "inherent" PIM comparison was also made on the Aracon mesh in order to compare it with a known gold-molybdenum mesh. The results of this comparison are shown in FIG. 7. The curve indicating the worst case seventh order of inherent PIM in dBm relative to the transmitted flux density (in mw/cm$^2$), the gold-molybdenum mesh curve, as indicated by the reference numeral 60. In contrast, the curve utilizing the present invention is shown by the reference numeral 62. Thus, as shown in FIG. 7, the present invention secures a significant reduction over known metallic mesh layers used for RF reflector surfaces.

In accordance with the present invention, the low PIM reflective surface can be made from a nickel metal materials, either of a radial nickel material or a coated nickel material. In addition, the low PIM reflective surface can be made of other metal materials, such as aluminum, gold, silver or copper, and be deposited as a thin film on a dielectric substrate, such as Mylar, Kapton, a plastic material, or the like. The thin film could be vacuum deposited on the surface, or be applied in any other conventional manner.

The material with the inventive surface thereon has preferred use as a reflector for a spacecraft antenna, but it also can be used for other reflectors or reflector-type surfaces. The material can either be a solid surface or a mesh of some type and the key is to control the thickness of the metallized layer in order to control the range of resistivity to maintain a lower PIM response. As indicated above, the range of resistivity is preferably 0.01 to 10 ohms per square.

When the metal material is plated, the thickness, thus the surface resistivity, is controlled by the plating thickness. When the metal material is formed as a thin film, the thickness and thus the surface resistivity is controlled by the deposition thickness. The layer can be a single homogeneous reflective layer, a metallized grid, a metallized balloon and the like.

While the best modes for carrying out the invention have been described in detail, those familiar with the art to which this invention relates will recognize various alternative designs and embodiments for practicing the invention as defined by the following claims.

What is claimed is:

1. A RF reflective member having a conductive layer thereon comprised substantially of a metal material, such metal material having a surface resistivity in the range of 0.01 to 10 ohms per square and an inherent PIM reduction between −2 to −70 dB.

2. A RF reflective member as defined in claim 1 wherein said metal material is nickel.

3. A RF reflective member as defined in claim 1 wherein said metal material is taken from the group consisting of copper, aluminum, gold and silver.

4. A RF reflective member as defined in claim 1 wherein said inherent PIM reduction is between −3 to −55 dB.

5. A RF reflective member as defined in claim 1 wherein said conductive layer of metal material is vacuum deposited on said member.

6. A mesh material for a spacecraft antenna reflector, comprising a base material and a conductive material, said base material being made from fibers of a dielectric material, and said conductive material being coated on said base material, the thickness of said conductive material being adjusted to achieve a resistivity in the range of 0.01 to 10 ohms per square.

7. The mesh material as defined in claim 6 wherein the surface resistivity is greater than 0.01 ohms per square for limiting the amount of inherent PIM generation, and wherein the surface resistivity is less than 10 ohms per square for limiting the amount of RF reflectivity loss.

8. The mesh material as defined in claim 6 wherein said mesh material is a woven tricot mesh material.

9. The mesh material as defined in claim 6 wherein the mesh material is composed of aramid threads individually plated with nickel.

10. The mesh material as defined in claim 6 wherein said fibers comprise aramid thread and said conductive material is nickel.

11. The mesh material as defined in claim 6 wherein said fibers comprise about a 55 Denier thread.

12. The mesh material as defined in claim 6 wherein each of said fibers is coated with nickel.

13. The mesh material as defined in claim 6 wherein the surface resistivity of the mesh material is a function of the thickness of said conductive material.

14. The mesh material as defined in claim 6 wherein the mesh material has a surface resistivity selected to limit inherent passive intermodulation generation while at the same time maintaining sufficient surface conductivity to retain free space RF reflectivity.

15. The mesh material as set forth in claim 6 wherein the surface resistivity is selected to maintain a RF reflectively loss less than −0.10 dB and to maintain an inherent PIM reduction at least −40 dB.

16. A process for producing a mesh material for a spacecraft antenna reflector comprising the steps of:

providing a mesh of dielectric fibers;

coating said fibers with a conductive material;

adjusting the coating of said conductive material to reduce PIM while simultaneously maintaining high RF reflectivity.

17. The process of claim 16 wherein said mesh layer comprises Kevlar fibers coated with a nickel-based conductive material.

18. The process of claim 16 further comprising securing said mesh material to a spacecraft antenna.

19. The process of claim 17 further comprising securing said mesh material to a spacecraft antenna.

* * * * *